(12) United States Patent
Zhang et al.

(10) Patent No.: US 12,517,223 B2
(45) Date of Patent: Jan. 6, 2026

(54) ADAPTIVE LIDAR DATA PROCESSING FOR DRIVERLESS VEHICLE

(71) Applicant: Baidu USA LLC, Sunnyvale, CA (US)

(72) Inventors: Manjiang Zhang, Sunnyvale, CA (US); Guoli Shu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 525 days.

(21) Appl. No.: 17/880,858

(22) Filed: Aug. 4, 2022

(65) Prior Publication Data
US 2024/0045027 A1 Feb. 8, 2024

(51) Int. Cl.
*G01S 7/48* (2006.01)
*G01S 17/931* (2020.01)

(52) U.S. Cl.
CPC .......... *G01S 7/4808* (2013.01); *G01S 7/4802* (2013.01); *G01S 17/931* (2020.01)

(58) Field of Classification Search
CPC ..... G01S 7/4802; G01S 7/4808; G01S 17/931
See application file for complete search history.

(56) References Cited

U.S. PATENT DOCUMENTS

| | | | |
|---|---|---|---|
| 10,771,669 B1* | 9/2020 | Balasubramanian | ... G01S 17/87 |
| 2005/0099289 A1* | 5/2005 | Arita | ...... G08B 25/10 |
| | | | 455/73 |
| 2017/0132241 A1* | 5/2017 | Haverkamp | ........ H03M 7/3088 |
| 2021/0011163 A1* | 1/2021 | Zhang | ................... G01S 13/865 |

* cited by examiner

*Primary Examiner* — Thanh Luu
(74) *Attorney, Agent, or Firm* — WOMBLE BOND DICKINSON (US) LLP

(57) ABSTRACT

In an embodiment, an autonomous driving vehicle (ADV) determines a LIDAR type, from of a plurality of LIDAR types, of a LIDAR unit. Responsive to determining the LIDAR type of the LIDAR unit, the ADV configures an adaptive LIDAR data processing system based on the LIDAR type. The adaptive LIDAR data processing system supports each one of the plurality of LIDAR types. In turn, responsive to configuring the adaptive LIDAR data processing system, the ADV establishes communication between the LIDAR unit and a host system using the adaptive LIDAR data processing system.

19 Claims, 7 Drawing Sheets

ADAPTIVE LIDAR DATA PROCESSING FOR DRIVERLESS VEHICLE

TECHNICAL FIELD

Embodiments of the present disclosure relate generally to operating autonomous driving vehicles (ADVs). More particularly, embodiments of the disclosure relate to dynamically configuring a LIDAR (Light Detection and Ranging) system based on a type of LIDAR connected to the ADV.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A LIDAR unit as a main sensor for 3D information on autonomous vehicles plays an important role to improve system functional safety levels. Several types of LIDAR units exist for use on an autonomous vehicle, such as a spinning mechanical type, a MEMS (micro-electromechanical systems) flashing type, a solid state type, and etcetera. Host systems connect to a LIDAR unit using logic specific to the type of LIDAR unit. The logic typically includes a software driver provided by the LIDAR vendor and/or hardware to process data to/from the LIDAR unit.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
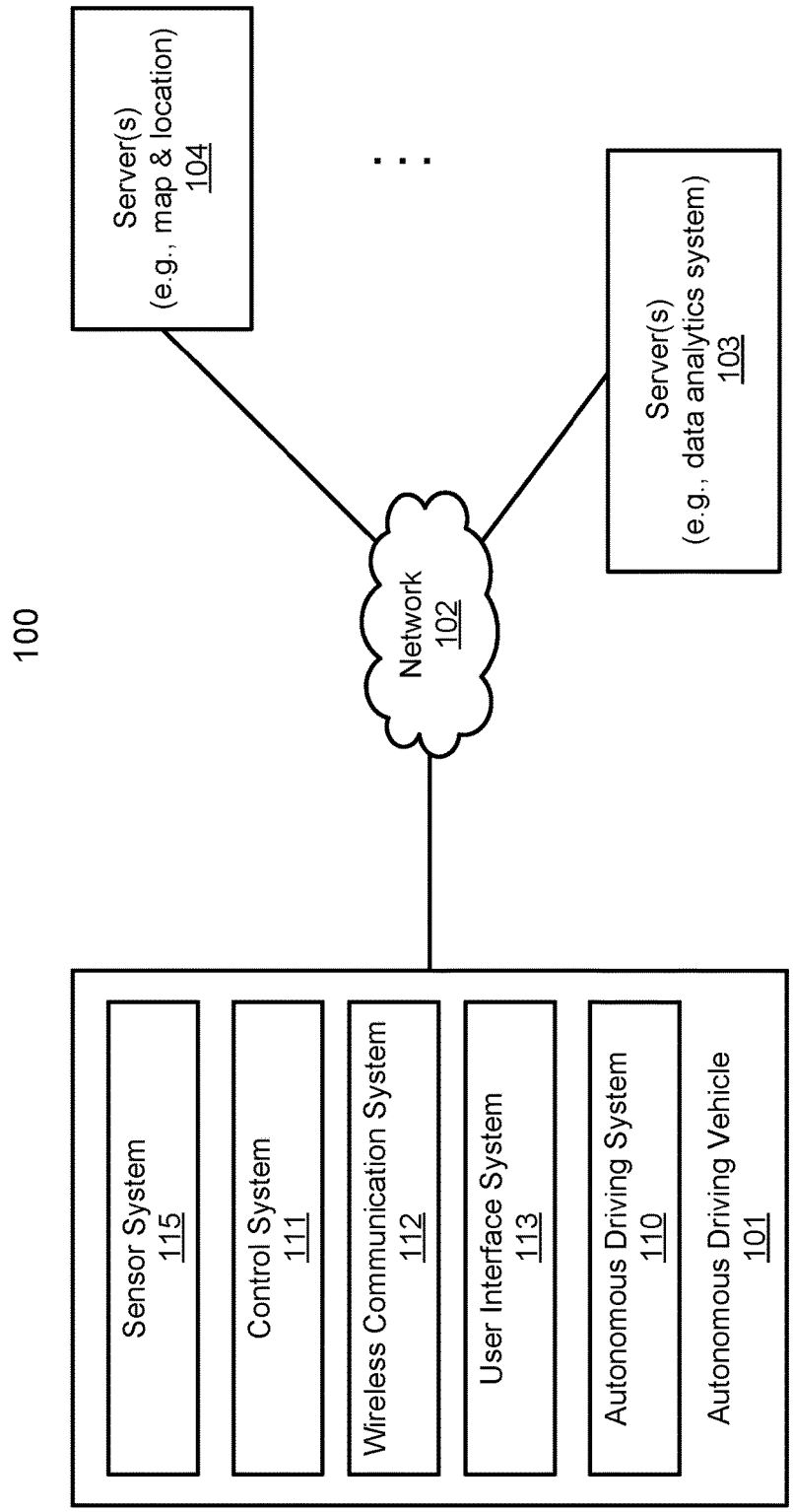
FIG. 1 is a block diagram illustrating a networked system according to one embodiment.

Various embodiments and aspects of the disclosure will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed above, each type of LIDAR unit may use a specific software driver and/or hardware to process data. Discussed herein is a flexible and consolidate data processing system, including both hardware and software, that adapts to the type of LIDAR unit connected to improve system data processing efficiency and reduce maintenance efforts.

According to one embodiment, an adaptive LIDAR data processing system determines a LIDAR type, from of a plurality of LIDAR types, of a LIDAR unit. Responsive to determining the LIDAR type of the LIDAR unit, the adaptive LIDAR data processing system is configured based on the LIDAR type. The adaptive LIDAR data processing system supports each one of the plurality of LIDAR types. The adaptive LIDAR data processing system then establishes communication between the LIDAR unit and a host system.

In one embodiment, the LIDAR unit is a first LIDAR unit and the LIDAR type is a first LIDAR type. In this embodiment, the adaptive LIDAR data processing system determines a second LIDAR type, from the plurality of LIDAR types, of a second LIDAR unit. Responsive to determining the second LIDAR type, the adaptive LIDAR data processing system is also configured based on the second LIDAR type. The adaptive LIDAR data processing system then simultaneously establishes communication between the first LIDAR unit and the host system, and between the second LIDAR unit and the host system.

In another embodiment, the adaptive LIDAR data processing system determines a time synchronization, from a plurality of time synchronizations, based on the LIDAR type. The adaptive LIDAR data processing system supports each one of the plurality of time synchronizations. The adaptive LIDAR data processing system applies the determined time synchronization to at least a portion of the communication established between the LIDAR unit and the host system.

In another embodiment, the adaptive LIDAR data processing system determines one or more operation modes, from a plurality of operation modes, based on the LIDAR type. The adaptive LIDAR data processing system supports each one of the plurality of operation modes. The adaptive LIDAR data processing system then applies the one or more operation modes to the LIDAR unit.

In another embodiment, the adaptive LIDAR data processing system sets, based on the one or more operation modes and the LIDAR type, one or more motion compensation parameters to at least a portion of the communication established between the LIDAR unit and the host system.

In another embodiment, the adaptive LIDAR data processing system identifies a unique tag included a set of packet data transmitted from the LIDAR unit. The adaptive LIDAR data processing system evaluates one or more sideband control signals transmitted from the LIDAR unit. The adaptive LIDAR data processing system then determines the LIDAR type based on the unique tag and the evaluation of the one or more sideband control signals.

In another embodiment, the adaptive LIDAR data processing system converts a set of pre-processed data received by the LIDAR unit to a set of raw data. The adaptive LIDAR data processing system then provides the set of raw data to the host system.

In another embodiment, the adaptive LIDAR data processing system comprises one or more hardware components coupled to the LIDAR unit and one or more software components executing on the host system and interfacing with the one or more hardware components.

In another embodiment, the one or more hardware components comprises a hardware accelerator that bypasses the one or more software components on the host system and sends data to a perception module executing on the host system.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
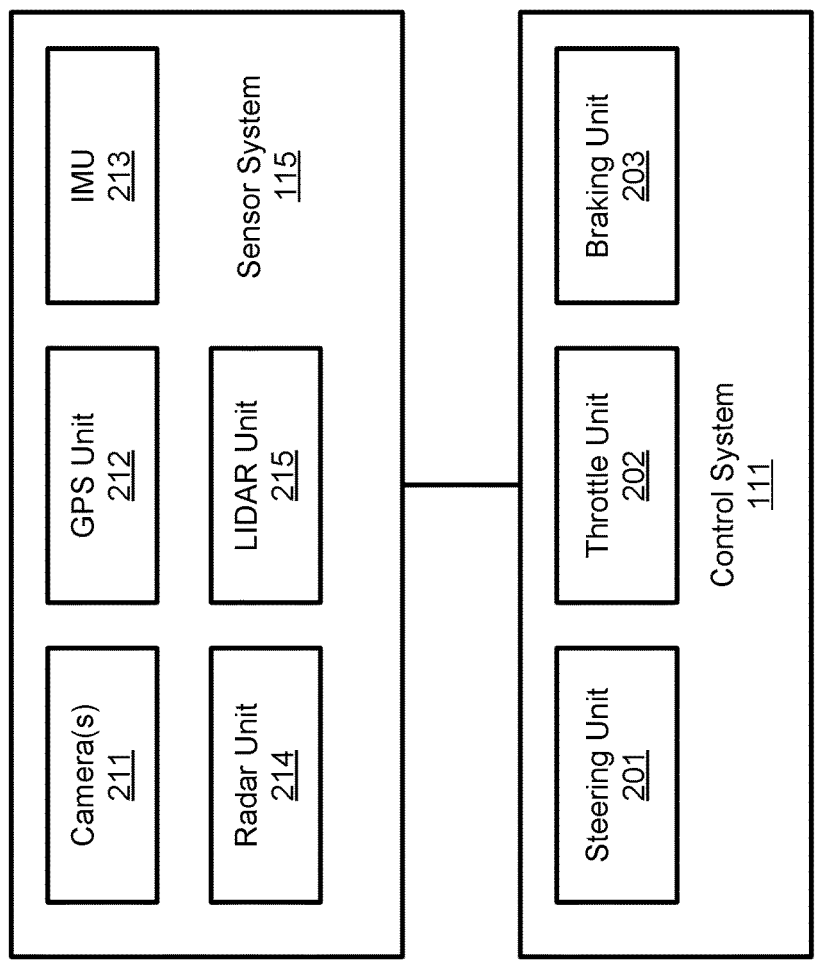
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
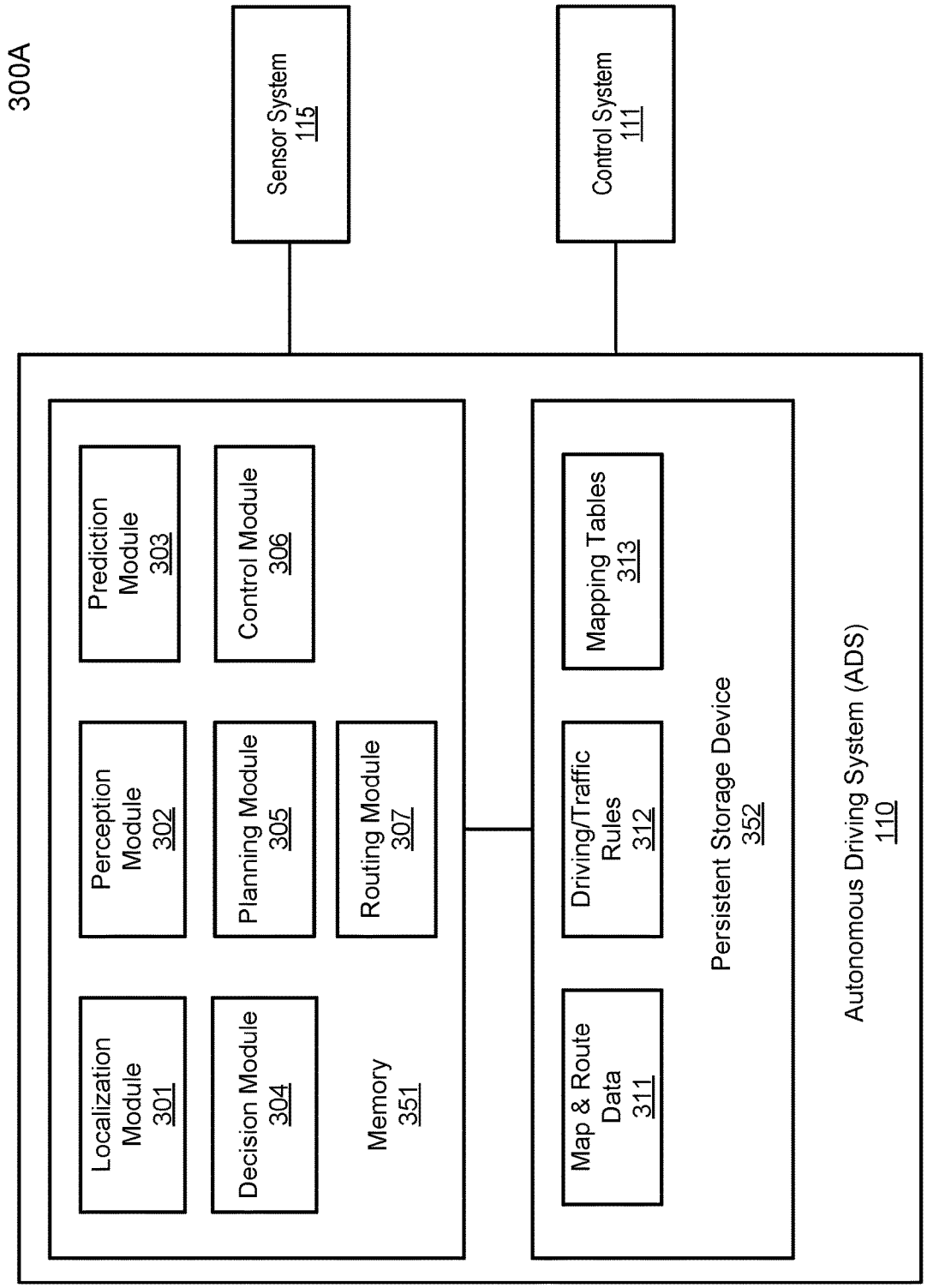
FIGS. 3A and 3B are block diagrams illustrating an example of an autonomous driving system used with an ADV according to one embodiment.
Figure 3B:
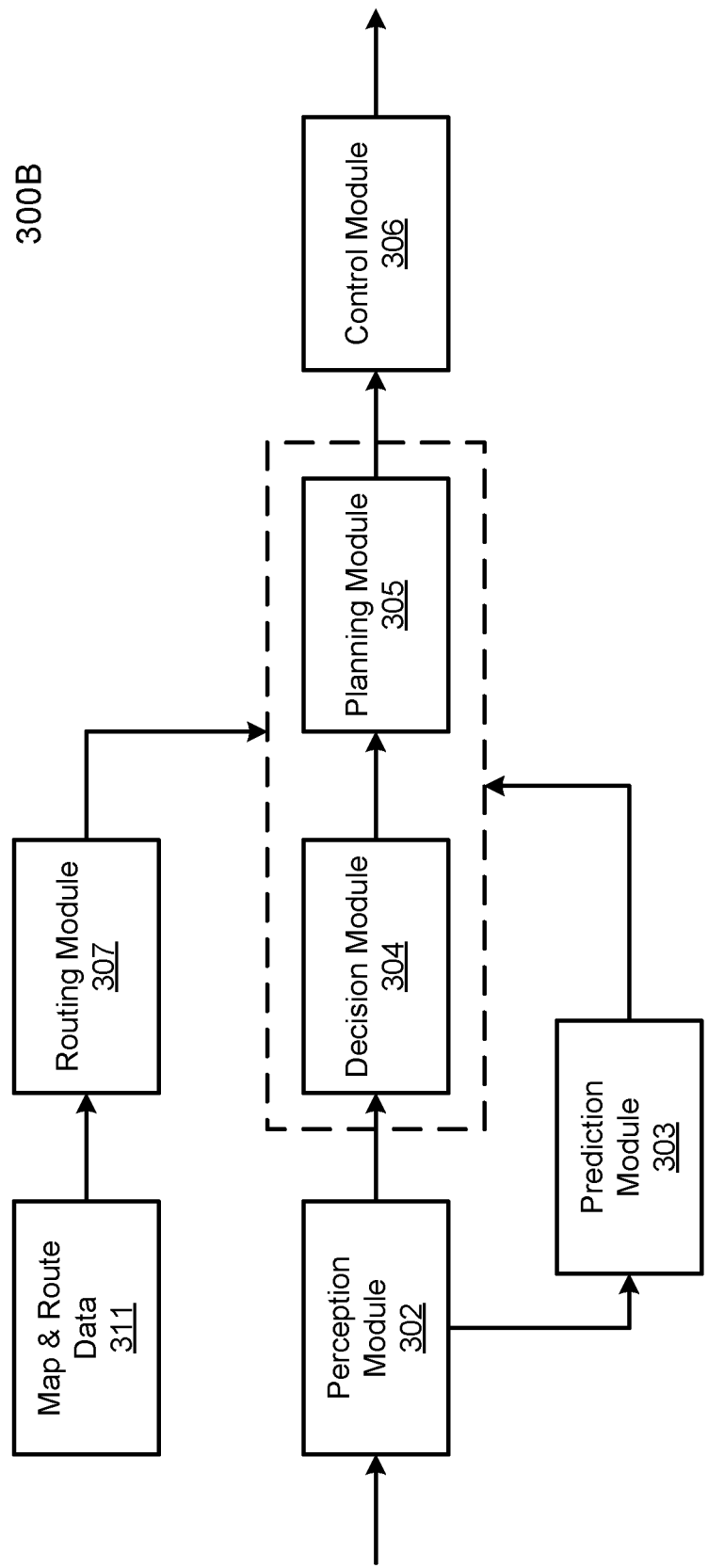

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
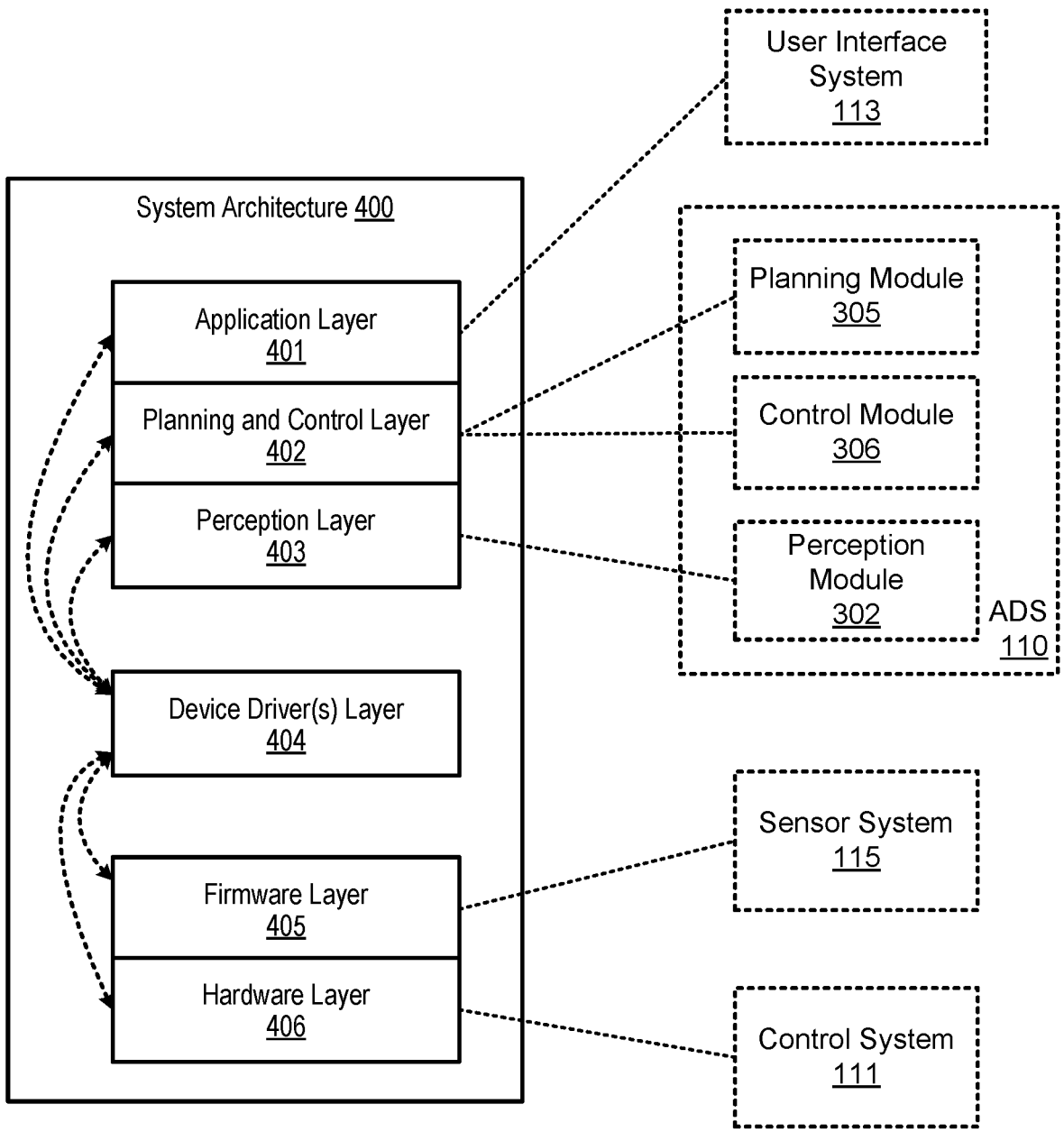
FIG. 4 is a block diagram illustrating system architecture for autonomous driving according to one embodiment.

FIG. 4 is a block diagram illustrating system architecture for autonomous driving according to one embodiment. System architecture 400 may represent system architecture of an autonomous driving system as shown in FIG. 1. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of ADS 110 and control system 111. Perception layer 403 may include functionalities of at least ADS 110. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
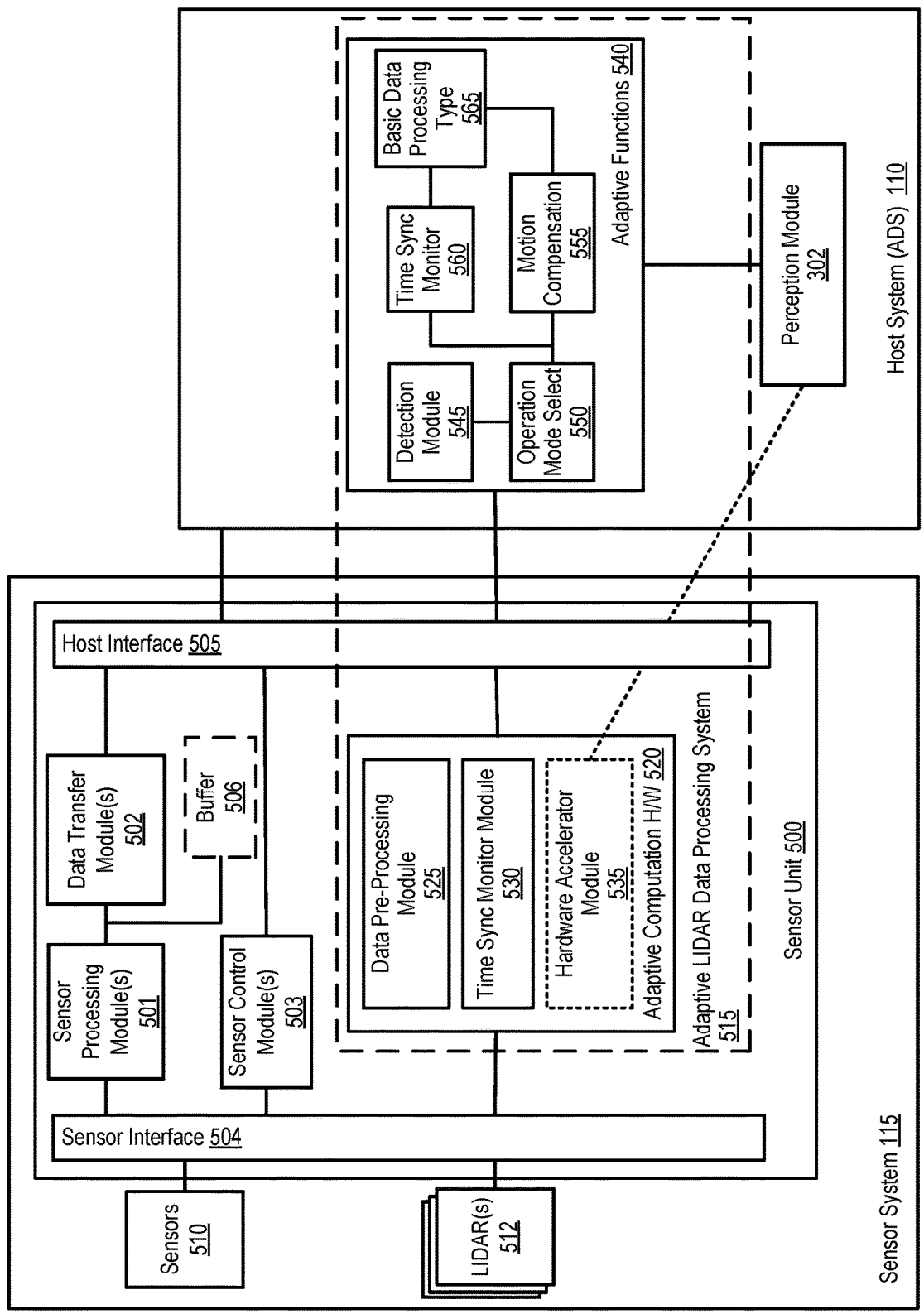
FIG. 5 is a block diagram illustrating an example of an adaptive LIDAR data processing system according to one embodiment of the invention.

FIG. 5 is a block diagram illustrating an example of an adaptive LIDAR data processing system according to one embodiment of the invention. Referring to FIG. 5, sensor system 115 includes a number of sensors 510 and a sensor unit 500 coupled to host system 110. Host system 110 represents a planning and control system as described above, such as ADS 110, and may include at least some of the modules as shown in FIG. 3A or 3B. Sensor unit 500 may be implemented, for example, in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 and LIDAR(s) 512 via a sensor interface 504 and communicate with host system 110 via host interface 505. Optionally, an internal or external buffer may be utilized for buffering the data for processing.

In one embodiment, sensors 510 may include a GPS receiver/unit and an IMU. The GPS unit and IMU may be coupled together with a sensor unit 500 on a single FPGA, or ASIC, referred to as an inertial measurement unit (INS). In one embodiment, sensors 510 include a first IMU as a primary IMU and a second IMU as a redundant or backup IMU, which may be independently powered by separate power supply circuits (such as voltage regulators). The sensor processing module 501 may include logic to receive data from the GPS unit and the IMU and combine the data (e.g., using a Kalman filter) to estimate a location of the automated vehicle. The sensor processing module 501 may further include logic to compensate for GPS data bias due to propagation latencies of the GPS data.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 and LIDAR(s) 512 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an ADV, such as, for example, a camera, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. Similarly, an internal SIM module can be inserted onto a SIM socket of sensor unit 500. The serial interface such as UART can be coupled with a console system for debug purposes. As discussed in detail below, sensors 510 may also include one or more LIDAR units, such as LIDAR(s) 512, which can couple via an Ethernet interface to sensor interface 504.

Sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel may include a specific sensor processing module and a specific data transfer module that have been configured or programmed to handle the corresponding sensor data and protocol.

In one embodiment, adaptive LIDAR data processing system 515 spans across sensor system 115 and host system 110. Adaptive LIDAR data processing system 515 includes adaptive computation hardware 520 components, such as data pre-processing module 525, time sync monitor module 530, and hardware accelerator module 535. Data pre-processing module 525 may include logic to process data received from LIDAR(s) 512 (e.g., format conversion, error checking, etc.). In one embodiment, data pre-processing module 525 converts a set of pre-processed data (e.g., point cloud data) received from LIDAR(s) 512 to a set of raw data, which is then sent to host system 110. In another embodiment, for the transmitting path, data pre-processing module 525 may convert data/instructions from host system 110 to a format that is compatible with the corresponding type of LIDAR(s) 512.

Time sync monitor module 530 applies different time synchronizations based on the identified LIDAR type coupled to sensor interface 504, such as GPRMC, gPTP, and etcetera. In one embodiment, time sync monitor module 530 applies multiple time synchronizations to different LIDAR types that are concurrently connected. For example, time sync monitor module 530 may simultaneously apply a first time synchronization to a first LIDAR of a first type, and apply a second time synchronization to a second LIDAR of a second type. In one embodiment, time sync monitor module 530 works with time sync monitor 560 (discussed below) to provide control signals to certain types of LIDAR(s) 512 that support internal time correction features (or different sets of control signals to different types of LIDARs. The control signals delivered through sensor interface 504 include square wave pulses, data packets with timing information, and etcetera.

Hardware accelerator module 535 provides a direct interface to perception module 302, bypassing adaptive functions 540. In one embodiment, one or more of adaptive computation hardware 520's components, or other hardware functions that are part of adaptive LIDAR data processing system 515, are located on host system 110.

Adaptive LIDAR data processing system 515 also includes adaptive functions 540 that, in one embodiment, are software modules executing on host system 110. The software functions include detection module 545, operation mode select 550, motion compensation 555, time sync monitor 560, and basic data processing type 565.

Detection module 545, in some embodiments, automatically checks the type of LIDAR unit and operation mode connected to sensor interface 504 by analyzing unique tag information received from data packets and/or checking multiple sideband control signals. In some embodiments, detection module 545 is informed of the type of LIDAR unit connected to sensor interface 504, such as through a user interface.

Operation mode select 550 determines valid operating modes of the LIDAR type (e.g., based on detected packet information, lookup tables, etc.) and provides the information to time sync monitor 560 and motion compensation 555. Time sync monitor 560 and time sync monitor module 530 work together as discussed above to monitor time-related signals from LIDAR(s) 512 and provide control signals to certain types of LIDAR(s) 512 that support internal time correction features.

Motion compensation 555 provides motion compensation functions to basic data processing type 565. In some embodiments, motion compensation 555 provides processed LIDAR point cloud data after corrections considering vehicle movement and vehicle position information.

Basic data processing type 565 processes data based on input received from time sync monitor 560 and motion compensation 555. In one embodiment, adaptive functions 540 may be based on a software driver provided by a LIDAR vendor and configured to adapt to the type of LIDAR connected to sensor interface 504.

Figure 6:
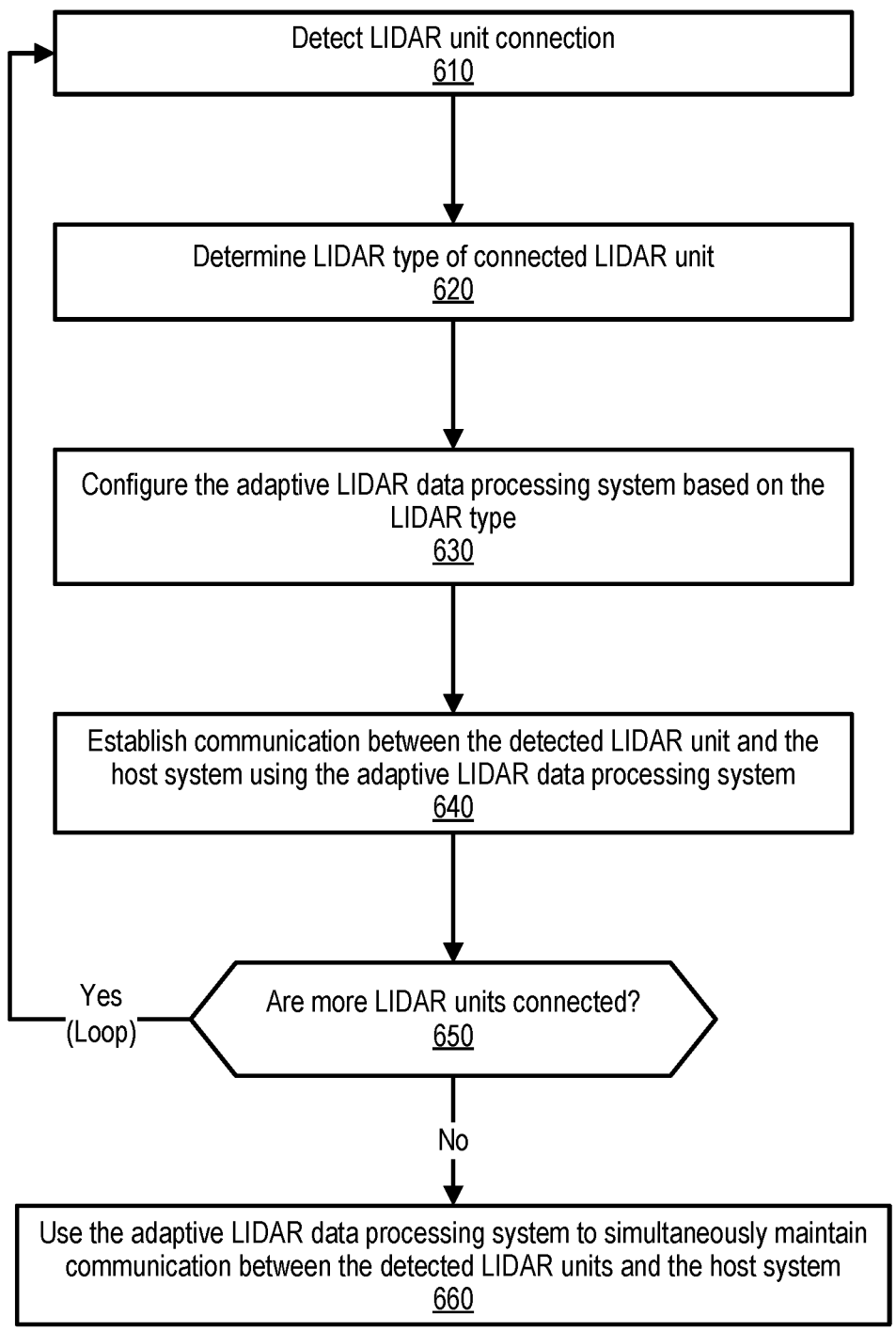
FIG. 6 is a is a flow diagram illustrating a method to dynamically configure an adaptive LIDAR data processing system.

FIG. 6 is a is a flow diagram illustrating a method to dynamically configure an adaptive LIDAR data processing system. Method 600 may be performed by processing logic that may include software, hardware, or a combination thereof. At block 610, the processing logic detects a LIDAR unit connection. In one embodiment, detection module 545 detects that the LIDAR unit connects to sensor interface 504. In another embodiment, detection module 545 receives an indication from a user via a user interface.

At block 620, the processing logic determines a LIDAR type of the connected LIDAR unit, such as a spinning mechanical type, a MEMS (micro-electromechanical systems) flashing type, a solid state type, and etcetera. In one embodiment, the processing logic may also identify the LIDAR vendor. In one embodiment, the processing logic may receive the LIDAR unit type information from a user via a user interface.

At block 630, the processing logic configures the adaptive LIDAR data processing system based on to the LIDAR type. Referring to FIG. 5, the processing logic configures operation mode select 550, time sync monitor 560, motion compensation 555, and basic data processing type 565 accordingly, such as applying correct time synchronizations, operational modes, and motion compensations. In one embodiment, the processing logic also configures one or more of adaptive computation hardware 520 modules. At block 640, the processing logic, establishes communication between the detected LIDAR unit and the host system (e.g., ADS 110) using the configured adaptive LIDAR data processing system.

Processing logic determines as to whether there is another LIDAR unit connected to sensor interface 504 (decision 650). If there is another LIDAR unit connected to sensor interface 504, decision 650 branches to the "Yes" loop to detect the type of LIDAR unit and configure the adaptive LIDAR data processing unit accordingly. This looping continues until the processing logic has configured the adaptive LIDAR data processing system for each connected LIDAR unit, at which point decision 650 branches to the "No" branch. At block 660, the processing logic maintains communication between the connected LIDAR units and the host system simultaneously.

Note that some or all of the components, features, and modules as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   determining a LIDAR type, from of a plurality of LIDAR types, of a LIDAR unit;
   responsive to determining the LIDAR type of the LIDAR unit, configuring an adaptive LIDAR data processing system based on the LIDAR type, wherein the adaptive LIDAR data processing system supports each one of the plurality of LIDAR types; and
   responsive to configuring the adaptive LIDAR data processing system, establishing communication between the LIDAR unit and a host system using the adaptive LIDAR data processing system, wherein the communication comprises receiving, at the adaptive LIDAR data processing system, a set of pre-processed data from the LIDAR unit;
   converting, by the adaptive LIDAR data processing system, the set of pre-processed data received from the LIDAR unit to a set of raw data; and
   providing the set of raw data to the host system.

2. The method of claim 1, wherein the LIDAR unit is a first LIDAR unit and the LIDAR type is a first LIDAR type, the method further comprising:
   determining a second LIDAR type, from the plurality of LIDAR types, of a second LIDAR unit;

responsive to determining the second LIDAR type, configuring the adaptive LIDAR data processing system based on the second LIDAR type; and simultaneously establishing communication between the first LIDAR unit and the host system, and between the second LIDAR unit and the host system, using the adaptive LIDAR data processing system.

3. The method of claim 1, further comprising:

determining a first time synchronization, from a plurality of time synchronizations, based on the LIDAR type, wherein the adaptive LIDAR data processing system supports each one of the plurality of time synchronizations; and applying the first time synchronization to at least a portion of the communication established between the LIDAR unit and the host system.

4. The method of claim 1, further comprising:

determining one or more operation modes, from a plurality of operation modes, based on the LIDAR type, wherein the adaptive LIDAR data processing system supports each one of the plurality of operation modes; and applying the one or more operation modes to the LIDAR unit.

5. The method of claim 4, further comprising:

setting, based on the one or more operation modes and the LIDAR type, one or more motion compensation parameters to at least a portion of the communication established between the LIDAR unit and the host system.

6. The method of claim 1, further comprising:

identifying a unique tag included a set of packet data transmitted from the LIDAR unit;

evaluating one or more sideband control signals transmitted from the LIDAR unit; and determining the LIDAR type based on the unique tag and the evaluation of the one or more sideband control signals.

7. The method of claim 1, wherein the adaptive LIDAR data processing system comprises one or more hardware components coupled to the LIDAR unit and one or more software components executing on the host system and interfacing with the one or more hardware components.

8. The method of claim 7, wherein the one or more hardware components comprises a hardware accelerator that bypasses the one or more software components on the host system and sends data to a perception module executing on the host system.

9. A non-transitory machine-readable medium having instructions stored therein, which when executed by a processor, cause the processor to perform operations, the operations comprising:

determining a LIDAR type, from of a plurality of LIDAR types, of a LIDAR unit;

responsive to determining the LIDAR type of the LIDAR unit, configuring an adaptive LIDAR data processing system based on the LIDAR type, wherein the adaptive LIDAR data processing system supports each one of the plurality of LIDAR types; and responsive to configuring the adaptive LIDAR data processing system, establishing communication between the LIDAR unit and a host system using the adaptive LIDAR data processing system, wherein the communication comprises receiving, at the adaptive LIDAR data processing system, a set of pre-processed data from the LIDAR unit;

converting, by the adaptive LIDAR data processing system, the set of pre-processed data received from the LIDAR unit to a set of raw data; and providing the set of raw data to the host system.

10. The non-transitory machine-readable medium of claim 9, wherein the LIDAR unit is a first LIDAR unit and the LIDAR type is a first LIDAR type, and wherein the operations further comprise:

determining a second LIDAR type, from the plurality of LIDAR types, of a second LIDAR unit;

responsive to determining the second LIDAR type, configuring the adaptive LIDAR data processing system based on the second LIDAR type; and simultaneously establishing communication between the first LIDAR unit and the host system, and between the second LIDAR unit and the host system, using the adaptive LIDAR data processing system.

11. The non-transitory machine-readable medium of claim 9, wherein the operations further comprise:

determining a first time synchronization, from a plurality of time synchronizations, based on the LIDAR type, wherein the adaptive LIDAR data processing system supports each one of the plurality of time synchronizations; and applying the first time synchronization to at least a portion of the communication established between the LIDAR unit and the host system.

12. The non-transitory machine-readable medium of claim 9, wherein the operations further comprise:

determining one or more operation modes, from a plurality of operation modes, based on the LIDAR type, wherein the adaptive LIDAR data processing system supports each one of the plurality of operation modes; and applying the one or more operation modes to the LIDAR unit.

13. The non-transitory machine-readable medium of claim 12, wherein the operations further comprise:

setting, based on the one or more operation modes and the LIDAR type, one or more motion compensation parameters to at least a portion of the communication established between the LIDAR unit and the host system.

14. The non-transitory machine-readable medium of claim 9, wherein the operations further comprise:

identifying a unique tag included a set of packet data transmitted from the LIDAR unit;

evaluating one or more sideband control signals transmitted from the LIDAR unit; and determining the LIDAR type based on the unique tag and the evaluation of the one or more sideband control signals.

15. A system comprising:

a processing device; and a memory to store instructions that, when executed by the processing device cause the processing device to:

determine a LIDAR type, from of a plurality of LIDAR types, of a LIDAR unit;

responsive to determining the LIDAR type of the LIDAR unit, configure an adaptive LIDAR data processing system based on the LIDAR type, wherein the adaptive LIDAR data processing system supports each one of the plurality of LIDAR types;

responsive to configuring the adaptive LIDAR data processing system, establish communication between the LIDAR unit and a host system using the adaptive LIDAR data processing system, wherein the communication receives, at the adaptive LIDAR data processing system, a set of pre-processed data from the LIDAR unit;

convert, by the adaptive LIDAR data processing system, the set of pre-processed data received from the LIDAR unit to a set of raw data; and provide the set of raw data to the host system.

16. The system of claim 15, wherein the LIDAR unit is a first LIDAR unit and the LIDAR type is a first LIDAR type, and wherein the instructions, when executed by the processing device cause the processing device to:

determine a second LIDAR type, from the plurality of LIDAR types, of a second LIDAR unit;

responsive to determining the second LIDAR type, configure the adaptive LIDAR data processing system based on the second LIDAR type; and simultaneously establish communication between the first LIDAR unit and the host system, and between the second LIDAR unit and the host system, using the adaptive LIDAR data processing system.

17. The system of claim 15, wherein the instructions, when executed by the processing device cause the processing device to:

determine a first time synchronization, from a plurality of time synchronizations, based on the LIDAR type, wherein the adaptive LIDAR data processing system supports each one of the plurality of time synchronizations; and apply the first time synchronization to at least a portion of the communication established between the LIDAR unit and the host system.

18. The system of claim 15, wherein the instructions, when executed by the processing device cause the processing device to:

identify a unique tag included a set of packet data transmitted from the LIDAR unit;

evaluate one or more sideband control signals transmitted from the LIDAR unit;

determine the LIDAR type based on the unique tag and the evaluation of the one or identify one or more operation modes, from a plurality of operation modes, based on the LIDAR type, wherein the adaptive LIDAR data processing system supports each one of the plurality of operation modes;

apply the one or more operation modes to the LIDAR unit; and set, based on the one or more operation modes and the LIDAR type, one or more motion compensation parameters to at least a portion of the communication established between the LIDAR unit and the host system.

19. The system of claim 15, wherein the data is a set of pre-processed data, and wherein the instructions, when executed by the processing device cause the processing device to:

convert, by the adaptive LIDAR data processing system, the set of pre-processed data received by the LIDAR unit to a set of raw data; and provide the set of raw data to the host system.

* * * * *